US012578437B2

(12) United States Patent
Honda et al.

(10) Patent No.: US 12,578,437 B2
(45) Date of Patent: Mar. 17, 2026

(54) DISTANCE MEASURING APPARATUS

(71) Applicant: Mitsubishi Electric Corporation, Tokyo (JP)

(72) Inventors: Natsuki Honda, Tokyo (JP); Masayuki Omaki, Tokyo (JP); Yoko Inoue, Tokyo (JP); Tomo Kishigami, Tokyo (JP); Shota Nakahara, Tokyo (JP); Yoshitaka Tsuboi, Tokyo (JP); Yosuke Takagawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1135 days.

(21) Appl. No.: 17/439,399

(22) PCT Filed: Mar. 28, 2019

(86) PCT No.: PCT/JP2019/013545
§ 371 (c)(1),
(2) Date: Sep. 15, 2021

(87) PCT Pub. No.: WO2020/194648
PCT Pub. Date: Oct. 1, 2020

(65) Prior Publication Data
US 2022/0146639 A1 May 12, 2022

(51) Int. Cl.
*G01S 7/481* (2006.01)
*G01S 17/931* (2020.01)

(52) U.S. Cl.
CPC .......... *G01S 7/4817* (2013.01); *G01S 17/931* (2020.01)

(58) Field of Classification Search
CPC ...... G01S 7/4817; G01S 17/931; G01S 17/10; G01S 7/4815
See application file for complete search history.

(56) References Cited

U.S. PATENT DOCUMENTS

2009/0051997 A1    2/2009   Maeno et al.
2014/0034817 A1*   2/2014   Nakamura ............... G01V 8/22
                                                              250/221

(Continued)

FOREIGN PATENT DOCUMENTS

JP        2003329961 A   * 11/2003
JP        2009-14698 A     1/2009

(Continued)

OTHER PUBLICATIONS

International Search Report and Written Opinion mailed on Jun. 25, 2019, received for PCT Application PCT/JP2019/013545, Filed on Mar. 28, 2019, 7 pages including English Translation.

*Primary Examiner* — Isam A Alsomiri
(74) *Attorney, Agent, or Firm* — XSENSUS LLP

(57) ABSTRACT
A distance measuring apparatus to measure a distance to an object includes: a plurality of light sources to emit a first light and a second light; a mirror; and a light receiving unit. When the mirror rotates about the first and third axes, an angle formed by an optical axis of the second light projected on the first plane and the second axis is larger than an angle formed by an optical axis of the first light projected on the first plane and the second axis, and an angle formed by the optical axis of the second light projected on the second plane and the second axis is larger than an angle formed by the optical axis of the first light projected on the second plane and the second axis.

19 Claims, 7 Drawing Sheets

(56)  References Cited

U.S. PATENT DOCUMENTS

| | | | |
|---|---|---|---|
| 2017/0350983 A1* | 12/2017 | Hall ......................... | G01S 7/487 |
| 2018/0364334 A1* | 12/2018 | Xiang ..................... | G01S 17/42 |
| 2022/0146639 A1* | 5/2022 | Honda .................. | G01S 7/4815 |

FOREIGN PATENT DOCUMENTS

| | | |
|---|---|---|
| JP | 2010-48662 A | 3/2010 |
| JP | 2015-125109 A | 7/2015 |
| WO | 2017/183530 A1 | 10/2017 |

* cited by examiner

DISTANCE MEASURING APPARATUS

CROSS-REFERENCE TO RELATED APPLICATION

The present application is based on PCT filing PCT/JP2019/013545, filed Mar. 28, 2019, the entire contents of which are incorporated herein by reference.

TECHNICAL FIELD

The present technical field relates to a distance measuring apparatus.

BACKGROUND ART

A laser radar scans laser light within a target area, and detects whether an object is present or absent at each scanned position from whether there is a reflection of light at each scanned position. Further, the distance to the object is detected based on the time required from when the laser light is emitted to when a reflection of light is received. In order to scan the laser light, for example, a mirror pivots about two axes.

For example, PTL 1 discloses a laser radar configured such that a mirror receives laser light at two different angles in the direction of rotation of a panning shaft in order to widen the laser light's scanning range to be larger than the angle at which the mirror can pivot in the panning direction.

CITATION LIST

Patent Literature

PTL 1: Japanese Patent Laid-Open No. 2015-125109 (page 3, paragraphs 0002 and 0003, page 6, paragraph 0035, and FIG. 6)

SUMMARY OF INVENTION

Technical Problem

When a plurality of light sources are reflected by a single mirror in order to widen a scanning range, their respective scanning ranges distort differently. This results in a plurality of scanning ranges with reduced continuity.

The present disclosure has been made to solve the above problem, and an object thereof is to improve continuity of a plurality of scanning ranges.

Solution to Problem

A distance measuring apparatus measures a distance to an object and includes a light source to emit light, a mirror to reflect the light emitted from the light source, and a light receiving unit to receive reflected light that is the light reflected by the object, wherein the light source includes a first light source to emit a first light and a second light source to emit a second light, a direction in which a distance measuring area is expanded by providing the light source as a plurality of light sources is defined as a first axis, an axis that is a normal to the mirror when the mirror is located at the center of a range of rotation and that is orthogonal to the first axis is defined as a second axis, an axis perpendicular to the first and second axes and passing through an intersection of the first and second axes is defined as a third axis, a plane including the first and second axes is defined as a first plane and a plane including the second and third axes is defined as a second plane, and when the mirror rotates about the first and third axes, an angle formed by an optical axis of the second light projected on the first plane and the second axis is larger than an angle formed by an optical axis of the first light projected on the first plane and the second axis, and an angle formed by the optical axis of the second light projected on the second plane and the second axis is larger than an angle formed by the optical axis of the first light projected on the second plane and the second axis.

Advantageous Effects of Invention

Continuity of scanning ranges using a plurality of light sources can be improved.

DESCRIPTION OF EMBODIMENTS

First Embodiment

Distance measuring apparatus 100 irradiates an object with light, and measures a distance to the object from light reflected by the object. Light reflected by the object will be referred to as returned light.

In recent years, distance measuring apparatuses using laser light have been used in automatically driving automobiles and the like. A conventional distance measuring apparatus detects whether there is an obstacle based on whether there is reflected light when laser light is emitted. The conventional distance measuring apparatus estimates the distance to the obstacle by using a difference in time between when the laser light is emitted and when the reflected light is received (for example, see PTL 1).

Hereinafter, distance measuring apparatus 100 according to the first embodiment will be described in detail with reference to the drawings. The following first embodiment shows a specific example. Accordingly, each component's shape, arrangement, material, and the like is by way of example, and are not intended to be limiting. The figures are each a schematic diagram, and not exactly illustrated. In the figures, identical components are identically denoted.

Figure 1:
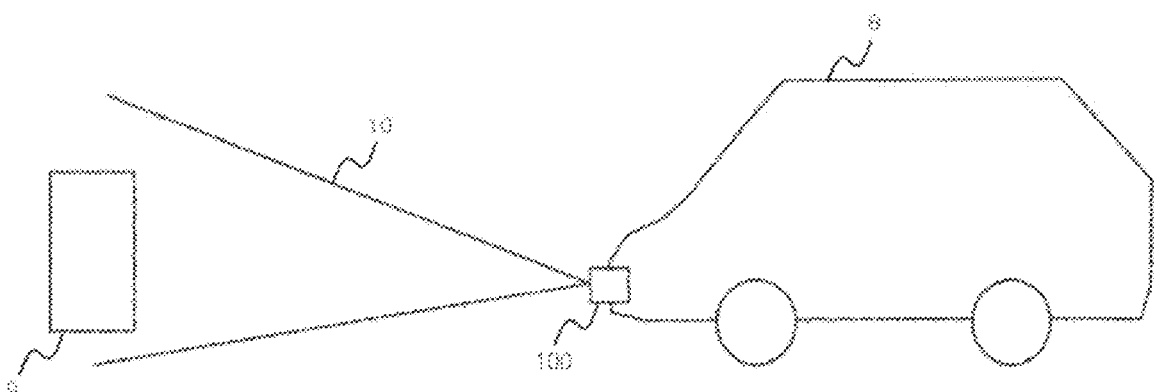
FIG. 1 shows a configuration in which a distance measuring apparatus 100 according to a first embodiment is installed in a vehicle.

FIG. 1 shows a configuration showing an example in which distance measuring apparatus 100 according to the first embodiment is installed in a vehicle 8. Distance measuring apparatus 100 is installed, for example, on a front surface of vehicle 8. Distance measuring apparatus 100 detects an object 9 in front thereof. Distance measuring apparatus 100 measures the distance to object 9. Object 9 is, for example, another vehicle, a bicycle, a pedestrian or the like. Distance measuring apparatus 100 emits light 10 and detects light 30 reflected from object 9. Then, distance measuring apparatus 100 generates a distance image.

<Configuration of Distance Measuring Apparatus 100>

Figure 2:
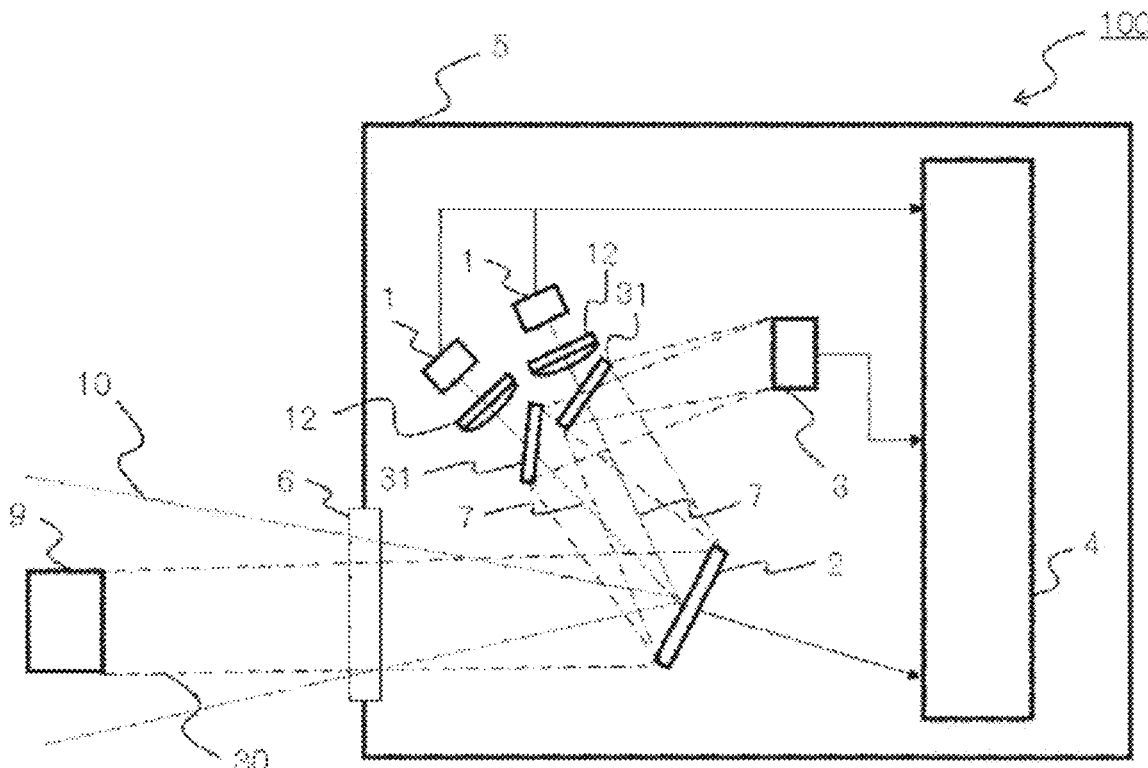
FIG. 2 shows a configuration of distance measuring apparatus 100 according to the first embodiment.

FIG. 2 shows a configuration of distance measuring apparatus 100 according to the first embodiment. Distance measuring apparatus 100 includes a plurality of light sources 1, a mirror 2, and a light receiving unit 3. Distance measuring apparatus 100 may include a control unit 4, a housing 5, a lens 12, and a mirror 31.

<<Light Source 1>>

Light source 1 emits light 7. Light source 1 is, for example, a laser light source. Distance measuring apparatus 100 can include a plurality of light sources 1.

<<Light 7>>

Light 7 is, for example, laser light. Light 7 is, for example, laser light having a wavelength of 870 nm to 1500 nm.

<<Lens 12>>

Lens 12 changes the light distribution of light 7 emitted from light source 1. "Light distribution" is a spatial distribution of light emanating from a light source. For example, lens 12 collimates light emitted from distance measuring apparatus 100. Lens 12 is, for example, a convex lens, a cylindrical lens, a toroidal lens, or the like. Lens 12 may be composed of two or more lenses. Lens 12 may be dispensed with. It should be noted, however, that preferably, light 7 is collimated when light 7 is emitted from housing 5.

<<Mirror 2>>

Mirror 2 reflects light 7 emitted from light source 1. Mirror 2 reflects light 7 having passed through lens 12. Emitted light 10 is light 7 reflected by mirror 2. Light 7 reflected by mirror 2 is emitted from distance measuring apparatus 100 as emitted light 10. Mirror 2 rotates, for example, about two rotation axes. Mirror 2 rotates, for example, about two orthogonal rotation axes. Rotation as referred to herein is a reciprocating operation in a direction of rotation about a rotation axis. Emitted light 10 is two-dimensionally scanned by mirror 2. The plurality of light sources 1 each emit light 7, which is in turn reflected by mirror 2 in a different direction.

<<Emitted Light 10>>

Emitted light 10 is laser light emitted from distance measuring apparatus 100. Emitted light 10 is, for example, collimated light. Emitted light 10 has a beam waist set to 60 m ahead, for example. Emitted light 10 is pulsed light. Emitted light 10 is, for example, pulsed light having a pulse width of 1 ns to 10 ns. Emitted light 10 irradiates object 9, for example. Emitted light 10 includes light 7 emitted from the plurality of light sources 1 and reflected by mirror 2.

<<Reflected Light 30>>

Reflected light 30 is emitted light 10 reflected by object 9. Reflected light 30 travels from object 9 toward distance measuring apparatus 100.

<<Light Receiving Unit 3>>

Light receiving unit 3 senses light. Light receiving unit 3 includes, for example, a light receiving element. The light receiving element is an element which detects light. The light receiving element is, for example, a photodiode, an avalanche photodiode or the like. Light receiving unit 3 senses reflected light 30. Reflected light 30 travels toward mirror 2. Accordingly, for example, when light receiving unit 3 is disposed near mirror 2, light receiving unit 3 can sense reflected light 30.

Light receiving unit 3 may sense reflected light 30 reflected by mirror 2. Reflected light 30 reflected by mirror 2 travels toward light source 1. Accordingly, light receiving unit 3 may be disposed near light source 1. Further, mirror 31 can be disposed near light source 1. Light receiving unit 3 may sense reflected light 30 reflected to mirror 31. Light receiving unit 3 can include a lens for collecting reflected light 30.

<<Mirror 31>>

Mirror 31 reflects light. Mirror 31 reflects reflected light 30 that is reflected by mirror 2 toward light receiving unit 3. Mirror 31 may pass light 7 received from light source 1. Mirror 31 is, for example, a mirror having a center with a hole. Mirror 31 may be one or more mirrors disposed so as to avoid the optical path of emitted light 10. Mirror 31 may be a mirror that transmits part of the light that irradiated an object, and reflects part thereof. Mirror 31 is, for example, a half mirror, a beam splitter or the like. Mirror 31 may have a light collecting function. Distance measuring apparatus 100 may dispense with mirror 31.

<<Control Unit 4>>

Control unit 4 controls operation of distance measuring apparatus 100. Control unit 4 may control light source 1, mirror 2, or light receiving unit 3. Control unit 4 controls light 7 emitted from light source 1. Control unit 4 controls when pulsed light 7 is emitted. Control unit 4 senses when light 7 is emitted from light source 1. Control unit 4 controls driving of mirror 2. Control unit 4 senses an angle of inclination of mirror 2. Control unit 4 senses an angle of a normal to mirror 2. Control unit 4 senses a state in which light receiving unit 3 receives light.

<<Housing 5>>

Housing 5 is, for example, a box of an exterior of the main body of distance measuring apparatus 100. Housing 5 can house the plurality of light sources 1, mirror 2, and light receiving unit 3. Housing 5 has, for example, a light shielding property. Housing 5 preferably has a black internal surface to absorb stray light. Housing 5 includes a window 6.

<<Window 6>>

Window 6 is, for example, an opening. Emitted light 10 is emitted outside housing 5 through window 6. Reflected light 30 enters housing 5 through window 6. Window 6 may block external light. Window 6 has, for example, a characteristic in wavelength with respect to light to be transmitted. Window 6 transmits only light having the same wavelength as light 7, for example. A plurality of windows 6 may be provided so that emitted light 10 travels along a path and reflected light 30 travels along a different path. Window 6 may include a light collecting function. Window 6 may include a light diverging function.

<Operation of Distance Measuring Apparatus 100>

How distance measuring apparatus 100 operates will now be described.

Light 7 emitted from light source 1 has its distribution changed by lens 12. Light 7 passing through lens 12 is, for example, collimated. Light 7 collimated passes through the hole of mirror 31. Light 7 collimated is transmitted through mirror 31. Light 7 having passed through lens 12 is reflected by mirror 2. Light 7 is reflected by mirror 2 and emitted from distance measuring apparatus 100 as emitted light 10. Since mirror 2 rotates, for example, about two orthogonal rotation axes, emitted light 10 reflected by mirror 2 is scanned two-dimensionally. Emitted light 10 two-dimensionally scanned is emitted outside housing 5 through window 6.

Emitted light 10 irradiates object 9, and reflected light 30 is generated. Reflected light 30 travels toward distance measuring apparatus 100. Reflected light 30 enters housing 5 through window 6. Reflected light 30 is incident on light receiving unit 3. Reflected light 30 may be incident on light receiving unit 3 directly. Reflected light 30 may be reflected by mirror 2 and then incident on light receiving unit 3. Reflected light 30 may be reflected by mirror 2 and mirror 31 and then incident on light receiving unit 3. Light receiving unit 3 senses reflected light 30. Control unit 4 measures a period of time elapsing from when light source 1 emits light 7 until when light receiving unit 3 senses reflected light 30. Control unit 4 uses the measured period of time to calculate the distance to object 9.

Control unit 4 detects the direction of the normal to mirror 2 while it performs rotational movement. In this case, for example, a sensor that senses the period of rotation of mirror 2 can be used. Further, control unit 4 can detect the direction of the normal from a signal driving mirror 2. From the position of light source 1 and the direction of the normal to mirror 2, control unit 4 calculates the direction in which emitted light 10 is emitted. Control unit 4 can calculate the direction and distance of object 9 using the direction in which emitted light 10 is emitted and the distance to object 9. Control unit 4 calculates the direction and distance of object 9 for each point in time while emitted light 10 is scanned. Thus, distance measuring apparatus 100 can obtain a distance image.

<<Arrangement of Plurality of Light Sources 1>>

A range of a scanning angle when the plurality of light sources 1 are used will now be described.

For ease of describing the figures, xyz coordinates are used. The coordinates are coordinates when the normal to mirror 2 that is a component of distance measuring apparatus 100 is set horizontally. Note, however, that, as mirror 2 performs rotational movement, the coordinates are coordinates when mirror 2 is at the center of a range of rotation. That is, the center of the range of rotation is the center of the range of the reciprocating operation in the direction of rotation.

The z-axis is a normal to mirror 2. The z-axis is a normal to a mirror surface of mirror 2. The z-axis is a direction frontwardly/rearwardly of mirror 2. A positive direction along the z-axis is a direction from the back surface of mirror 2 toward a reflecting surface thereof. The y-axis is a direction upwardly/downwardly of mirror 2. A positive direction along the y-axis is an upward direction (a direction toward the sky), and a negative direction along the y-axis is a downward direction (a direction toward the ground). The x-axis is a direction rightwardly/leftwardly of mirror 2. A positive direction along the x-axis is a rightward direction as seen in a direction facing the reflecting surface of mirror 2, and a negative direction along the x-axis is a leftward direction as seen in the direction facing the reflecting surface of mirror 2. Mirror 2 rotates about the x- and y-axes. That is, the center of rotation of mirror 2 is a point of intersection of the x-, y- and z-axes. The x-axis is defined as a first axis. The z-axis is defined as a second axis. The y-axis is defined as a third axis.

Figure 3:
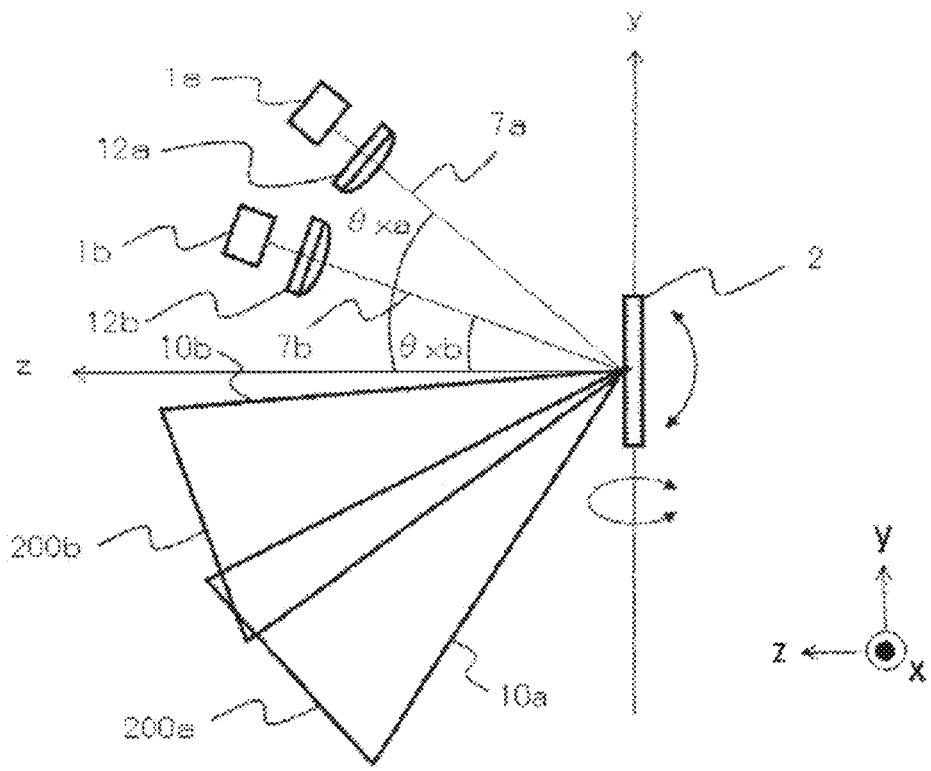
FIG. 3 illustrates an example in which two light sources 1 are used.

FIG. 3 illustrates an example with two light sources 1 used. FIG. 3 represents light source 1 and a scanning range of emitted light 10 in the yz plane. A light source 1a is located higher in level than a light source 1b in the yz plane. That is, light source 1a is located on the yz plane on a side more positive in the direction along the y-axis than light source 1b. An angle formed in the yz plane by the optical axis of light 7 emitted from light source 1 and the z-axis is an angle θx. An angle formed in the yz plane by the optical axis of light 7a emitted from light source 1a and the z-axis is an angle θxa. Similarly, an angle formed in the yz plane by the optical axis of light 7b emitted from light source 1b and the z-axis is an angle θxb. Angle θxa is larger than angle θxb (θxa>θxb). The yz plane is defined as a second plane.

Lights 7a and 7b emitted from light sources 1a and 1b are incident on mirror 2 while it rotates. Mirror 2 reflects and causes emitted lights 10a and 10b to scan scanning ranges 200a and 200b. In FIG. 3, scanning ranges 200a and 200b are each indicated by an isosceles triangle. It should be noted, however, that emitted lights 10a and 10b are scanned radially from mirror 2. Emitted lights 10a and 10b are each directed to irradiate object 9 within the range of the vertex angle of the isosceles triangle.

Light 7a emitted from light source 1a is incident on mirror 2 from a side upper (i.e., a side more positive in the direction along the y-axis) than light 7b emitted from light source 1b. Therefore, scanning range 200a by light source 1a is located on a side lower (i.e., a side more negative in the direction along the y-axis) than scanning range 200b.

Figure 4:
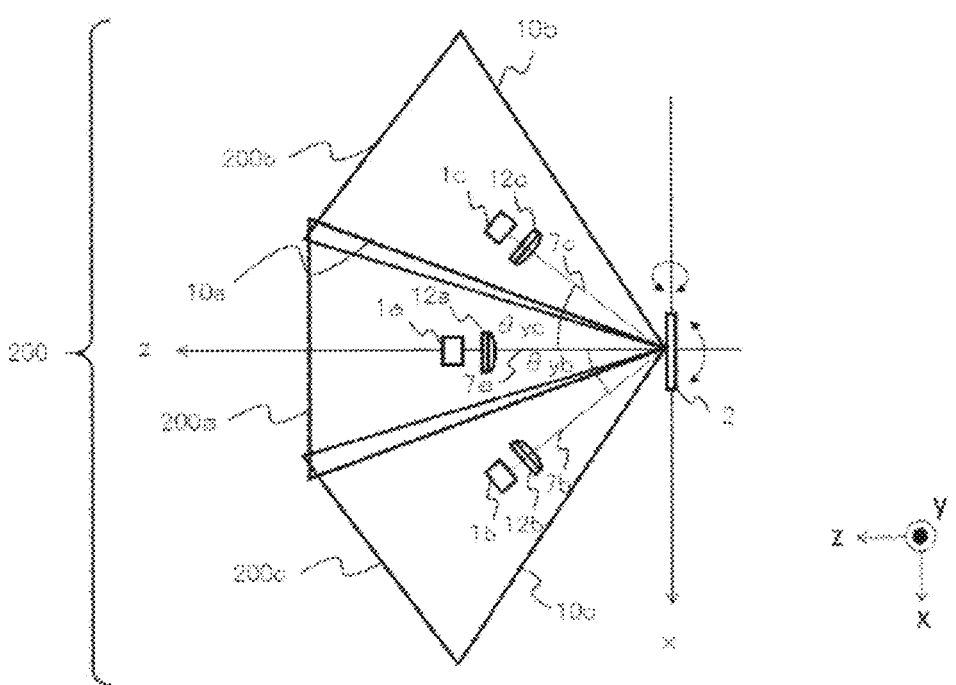
FIG. 4 illustrates an example in which three light sources 1 are used.

FIG. 4 illustrates an example with three light sources 1a, 1b, and 1c used. FIG. 4 represents light sources 1a, 1b, and 1c and the scanning ranges of emitted lights 10a, 10b, and 10c in the zx plane. The zx plane is defined as a first plane.

Light source 1a is disposed on the zx plane on the z-axis. Light 7a emitted from light source 1a passes through lens 12a and is incident on mirror 2 from a side positive in the direction along the z-axis. Emitted light 10a reflected by mirror 2 scans scanning range 200a. Scanning range 200a is symmetric with respect to the z-axis.

Light source 1b is disposed on the zx plane on a side more positive in the direction along the x-axis than light source 1a. An angle formed in the zx plane by the optical axis of light 7b emitted from light source 1b and the z-axis is an angle θyb. Light 7b emitted from light source 1b passes through lens 12b and is incident on mirror 2 from a side positive in the direction along the z-axis. Emitted light 10b reflected by mirror 2 scans scanning range 200b. Scanning range 200b is located on a side more negative along the x-axis than scanning range 200a.

Light source 1c is disposed on the zx plane on a side more negative in the direction along the x-axis than light source 1a. An angle formed in the zx plane by the optical axis of light 7c emitted from light source 1c and the z-axis is an angle θyc. Light 7c emitted from light source 1c passes through lens 12c and is incident on mirror 2 from a side positive in the direction along the z-axis. Emitted light 10c reflected by mirror 2 scans scanning range 200c. Scanning range 200c is located on a side more positive along the x-axis than scanning range 200a.

As shown in FIG. 4, when light sources 1a, 1b, and 1c are disposed in a direction along the x-axis, scanning ranges 200a, 200b, and 200c can be arranged in a direction along the x-axis. A direction along the x-axis is, for example, a direction in which the plurality of light sources 1a, 1b, and 1c are disposed. That is, the direction along the x-axis is, for example, a direction in which a distance measuring area is expanded by using the plurality of light sources 1. Distance measuring apparatus 100 can widen scanning range 200 in the direction along the x-axis. Scanning range 200 includes scanning ranges 200a, 200b, and 200c.

However, when light sources 1a, 1b, and 1c are disposed within scanning ranges 200a, 200b, and 200c, emitted lights 10a, 10b, and 10c are blocked by light sources 1a, 1b, and 1c. Accordingly, as shown in FIG. 3, light sources 1a, 1b, and 1c are moved from the z-axis in a direction along the y-axis. That is, light sources 1a, 1b, and 1c are disposed at positions offset from the zx plane in the direction along the y-axis. In FIG. 3, light sources 1a, 1b, and 1c are disposed at positions offset in a direction more positive along the y-axis than the zx plane. Thus, emitted lights 10a, 10b, and 10c are not blocked by light sources 1a, 1b, and 1c.

Figure 5:
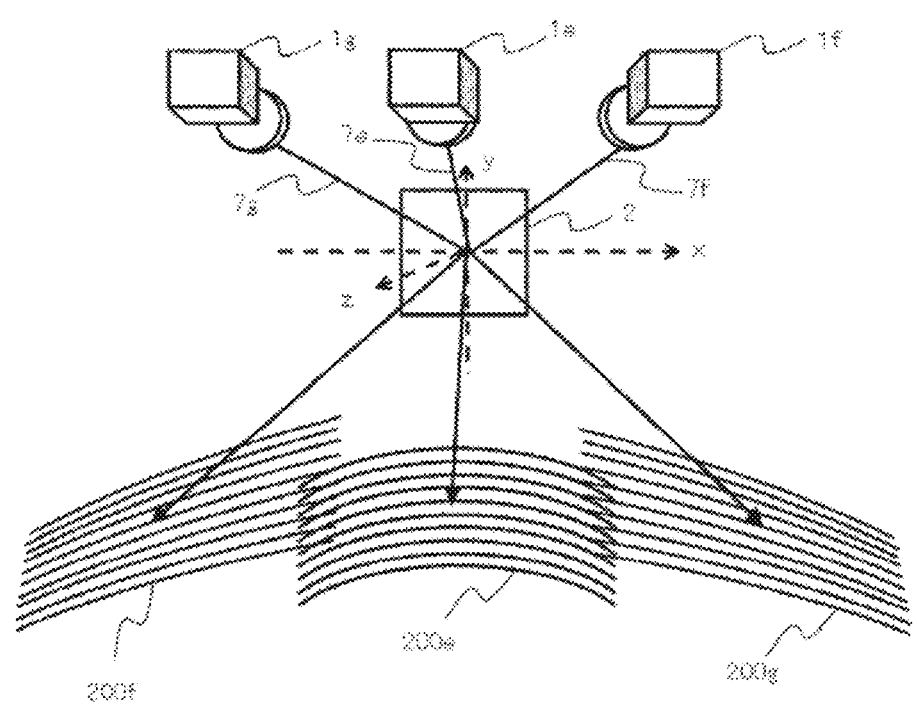
FIG. 5 illustrates an example of a relationship between light source 1 and a scanning range 200.

FIG. 5 illustrates an example of a relationship between light source 1 and scanning range 200. FIG. 5 represents scanning ranges 200e, 200f and 200g when light sources 1e, 1f, and 1g are aligned in the direction along the x-axis.

In FIG. 5, mirror 2 has a center of rotation on the z-axis. Mirror 2 has the reflecting surface rotated about the x- and y-axes symmetrically with respect to the z-axis.

Initially, a case with light source 1 disposed on the z-axis will be described. Light source 1 is disposed on the z-axis. Light 7 emitted from light source 1 travels on the z-axis and is thus incident on mirror 2. Under this condition, it is assumed that scanning range 200 of emitted light 10 is in the form of a rectangle when seen in the direction along the z-axis.

A case with light source 1 disposed at a position offset from the z-axis will be described. In FIG. 5, for example, light source 1 is disposed at a position offset in the positive direction along the y-axis with respect to the z-axis. In this case, scanning range 200 has a center at a position on scanning range 200 of emitted light 10 when the normal to mirror 2 matches the z-axis. Emitted light 10 serving as the center of scanning range 200 is symmetrical to light 7 emitted from light source 1 with respect to the z-axis.

Scanning range 200 shown in FIG. 5 is formed in a plane away from mirror 2 in the direction along the z-axis. In FIG. 5, scanning range 200 is located on a side more positive in the direction along the z-axis than mirror 2. Scanning range 200 is formed on a plane perpendicular to emitted light 10 serving as the center.

Scanning ranges 200e, 200f, and 200g are the scanning ranges of lights 7e, 7f and 7g emitted from light sources 1e, 1f and 1g, respectively. Scanning ranges 200e, 200f and 200g of lights 7e, 7f and 7g emitted from light sources 1e, 1f and 1g are represented on different planes, respectively. The planes on which scanning ranges 200e, 200f, and 200g are represented are equal in distance to mirror 2. In FIG. 5, for ease of description, for example, scanning range 200 formed on a plane perpendicular to emitted light 10 serving as the center is projected on the xy plane.

In FIG. 5, angles θxe, θxf, and θxg formed on the yz plane by the optical axes of lights 7e, 7f, and 7g emitted from light sources 1e, 1f, and 1g and the z-axis are equal (i.e., θxe=θxf=θxg). The angles formed in the zx plane by the optical axes of lights 7e, 7f, and 7g emitted from light sources 1e, 1f, and 1g and the z-axis are angles θye, θyf, and θyg. Angle θye is 0 degree. Angles θyf and θyg are larger than angle θye (i.e., [θyf]>|θye|, and |θyg|>|θye|).

In FIG. 5, angles θxe, θxf, and θxg are equal in value. Angles θyf and θyg are larger than angle θye. In this case, scanning ranges 200f and 200g have large distortion from the rectangle, as compared with scanning range 200e. Further, the right end of scanning range 200e and the left end of scanning range 200g overlap each other. In the direction along the y-axis, the position of the right end of scanning range 200e is different from the position of the left end of scanning range 200g. Similarly, in the direction along the y-axis, the position of the left end of scanning range 200e is different form the position of the right end of scanning range 200f.

Thus, in FIG. 5, light sources 1e, 1f, and 1g are aligned in the direction along the x-axis with their respective positions equal in the direction along the y-axis. In this case, the distance images obtained from scanning ranges 200e, 200f, and 200g are generally not continuous in the direction along the y-axis. The distance images obtained from scanning ranges 200f and 200g have a large distortion as compared with the distance image obtained from scanning range 200e.

Figure 6:
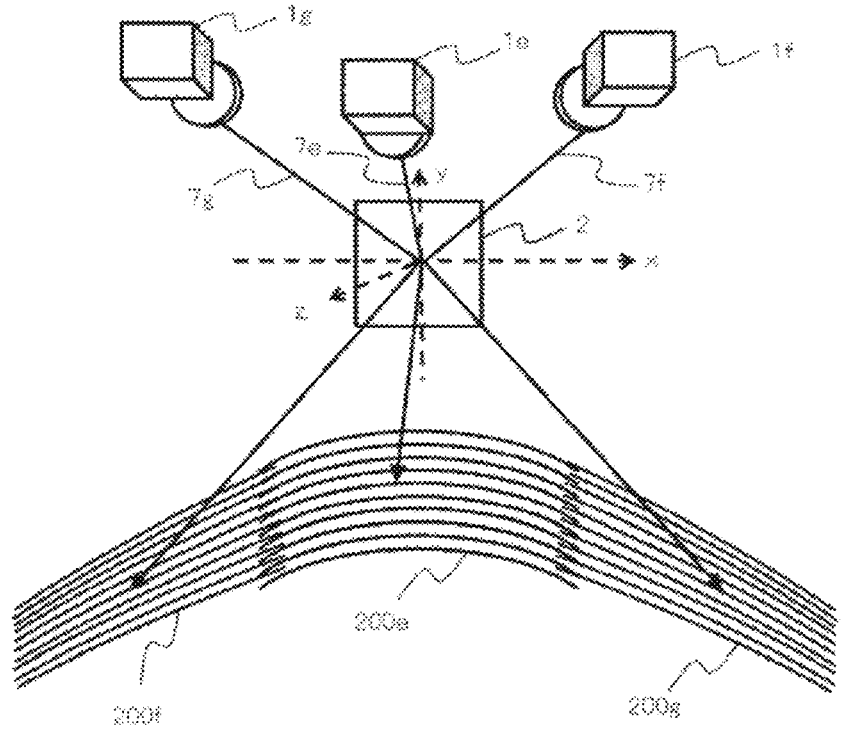
FIG. 6 illustrates another example of the relationship between light source 1 and scanning range 200.

FIG. 6 illustrates another example of the relationship between light source 1 and scanning range 200. FIG. 6 shows an example in which light sources 1f and 1g are disposed at a position higher in level (i.e. in the positive direction along the y-axis) from the FIG. 5 arrangement of light sources 1e, 1f and 1g. Except for this difference, the configuration shown in FIG. 6 is the same as the configuration shown in FIG. 5.

In FIG. 6, angles θxf and θxg are larger than angle θxe (i.e., θxf>θxe, and θxg>θxe). Angles θxf and θxg are angles formed on the yz plane by the optical axes of lights 7f and 7g emitted from light sources 1f and 1g and the z-axis. Angle θxe is an angle formed on the yz plane by the optical axis of light 7e emitted from light source 1e and the z-axis. Angles θye, θyf, and θyg are the same as those in the example of FIG. 5. Angles θye, θyf, and θyg are the angles formed on the zx plane by the optical axes of lights 7e, 7f, and 7g emitted from light sources 1e, 1f, and 1g and the z-axis.

Disposing light sources 1f and 1g to be high in level lowers scanning ranges 200f and 200g in level. That is, moving light sources 1f and 1g in the positive direction along the y-axis with respect to the FIG. 5 configuration moves scanning ranges 200f and 200g in the negative direction along the y-axis. This can improve continuity of scanning ranges 200e, 200f, and 200g. For example, scanning ranges 200e, 200f, and 200g can have their respective uppermost scanning lines (i.e., their respective lines on the most positive side in the direction along the y-axis) continuously.

When two light sources 1 are disposed parallel to the x-axis, in order to improve continuity of two adjacent scanning ranges 200, light source 1 having a large distance from the z-axis is set to be high in level (i.e., on a side more positive in the direction along the y-axis). That is, angle θx of light source 1 having large angle θy is made larger than angle θx of light source 1 having small angle θy. In the configuration shown in FIG. 6, angles θxf and θxg of light sources 1f and 1g having large angle θy are larger than angle θxe of light source 1e having small angle θy. Note that herein an angle is handled as an absolute value.

Therefore, a condition is indicated by using an incident angle on mirror 2 of the optical axis of light 7 emitted from light source 1. Continuity of two adjacent scanning ranges 200a and 200b can be improved by satisfying the following condition: When angle θyb is larger than angle θya on the zx plane, angle θxb is larger than angle θxa on the yz plane. Angle θya is an angle formed on the zx plane by the optical axis of light 7a emitted from light source 1a and the z-axis. Angle θyb is an angle formed on the zx plane by the optical axis of light 7b emitted from light source 1b and the z-axis. Angle θxa is an angle formed on the yz plane by the optical axis of light 7a emitted from light source 1a and the z-axis.

Angle θxb is an angle formed on the yz plane by the optical axis of light 7b emitted from light source 1b and the z-axis. Note, however, that angles θxa, θxb, θya, and θyb each constantly have a positive value (or absolute value) to indicate a magnitude of an angle. Light sources 1a and 1b are both present on the positive side along the y-axis or present on the negative side along the y-axis.

Similarly, continuity of three adjacent scanning ranges 200a, 200b and 200c can be improved by satisfying the following condition: The larger angles θya, θyb, and θyc are, the larger angles θxa, θxb, and θxc are made. Angles θya, θyb, and θyc are angles formed on the zx plane by the optical axes of lights 7a, 7b, and 7c emitted from light sources 1a, 1b, and 1c and the z-axis. Angles θxa, θxb, and θxc are angles formed on the yz plane by the optical axes of lights 7a, 7b, and 7c emitted from light sources 1a, 1b, and 1c and the z-axis.

Further, for example, in order to improve continuity of five adjacent scanning ranges 200, light source 1 having a larger distance from the z-axis is set to be higher in level (i.e., on a side more positive in the direction along the y-axis). In FIG. 6, light source 1e has a position with angle θxe of 0 degrees. That is, light source 1e is located above the z-axis (on the positive side in the direction along the y-axis). However, angle θxe may be other than 0 degree.

Figure 7:
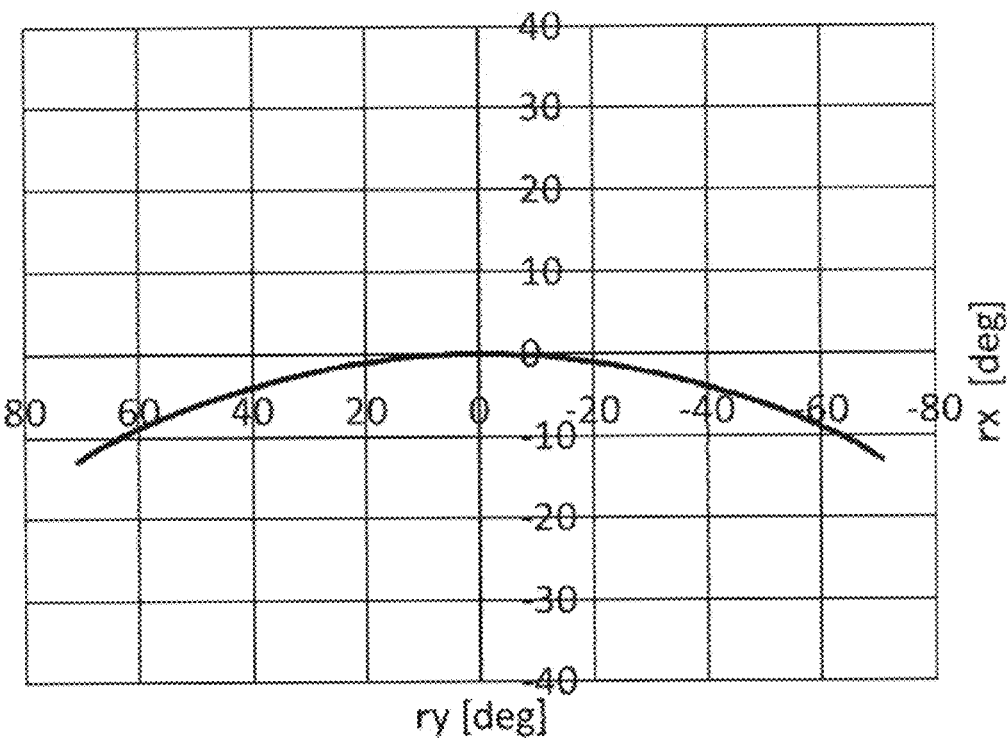
FIG. 7 illustrates an example of a locus of emitted light 10.

A guideline for determining light source 1 in level will now be specified. FIG. 7 illustrates an example of a locus of emitted light 10. FIG. 7 shows a locus of the optical axis of emitted light 10 provided by light source 1a. The vertical axis represents pitch angle. The vertical axis represents an angle of rotation about the x-axis, and the angle of rotation is represented as rx [deg]. The horizontal axis represents yaw angle. The horizontal axis represents an angle of rotation about an axis perpendicular to rx, and the angle of rotation is represented as ry [deg]. Light source 1a is disposed above the x-axis (on the positive side in the direction along the y-axis). Angle θxa is 16.5 [deg]. Angle θxa is an angle formed on the yz plane by the optical axis of light 7a emitted from light source 1a and the z-axis. Mirror 2 is rotated about the y-axis from a state in which the normal to mirror 2 matches the z-axis. In doing so, mirror 2 rotates while the normal to mirror 2 is located on the zx plane.

The plurality of lights 7 are such that the larger a yaw angle about the y-axis with respect to the z-axis is in absolute value, the larger a pitch angle about the x-axis with respect to the z-axis is.

Light 7a emitted from light source 1a and emitted light 10 reflected by mirror 2 are symmetrical with respect to the normal to mirror 2. Therefore, when mirror 2 is rotated, the optical axis of emitted light 10 forms an angle of 16.5 [deg] with the zx plane. In order to explain the reason for the above, let us dispose light source 1 at one point on a surface of a sphere and dispose mirror 2 at the center of the sphere, and consider a point of intersection of the optical axis of emitted light 10 and the spherical surface when mirror 2 is rotated. By rotating mirror 2, the normal to mirror 2 moves on a spherical surface corresponding to the equator of the earth. The equator is a line formed by intersection of the surface of the ground and a plane passing through the center of the earth and perpendicular to the axis of rotation of the Earth. Therefore, the point of intersection of the optical axis of emitted light 10 on the spherical surface exists on the same latitude passing through a position symmetrical to light source 1 with respect to the equator.

FIG. 7 is a locus of the optical axis of emitted light 10 of light source 1a under the above condition. A direction of the optical axis of emitted light 10 of light source 1 when the normal to mirror 2 matches the z-axis is represented by (0, 0), and a relative direction of the optical axis of emitted light 10 when mirror 2 is rotated is represented by an angle.

The optical axis of emitted light 10 constantly maintains an angle of 16.5 [deg] with respect to the zx plane. Therefore, the optical axis of emitted light 10 is emitted in a direction of 16.5 [deg] downward as seen at mirror 2 (i.e., in the negative direction along the y-axis). However, when the locus of the optical axis of emitted light 10 is observed from mirror 2 in the direction along the z-axis, the optical axis of emitted light 10 has a locus high at the center and low at opposite ends.

Figure 8:
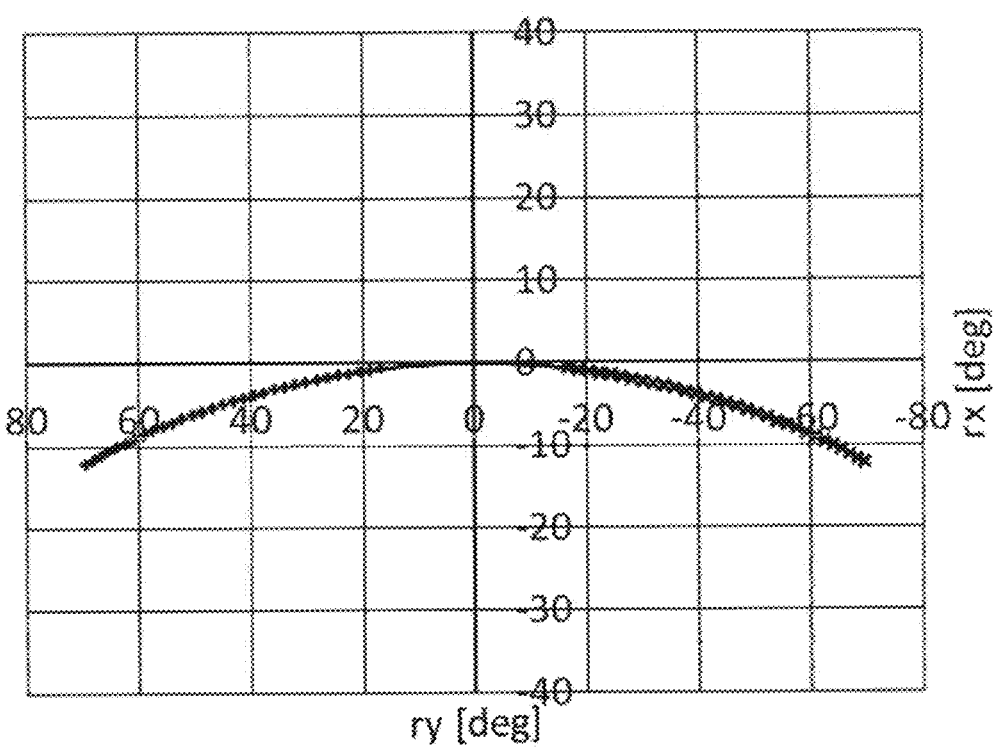
FIG. 8 illustrates another example of the locus of emitted light 10.

FIG. 8 illustrates another example of the locus of the optical axis of emitted light 10. FIG. 8 is a locus of the optical axes of emitted light 10 of light sources 1a, 1b, and 1c. The vertical axis and the horizontal axis are the same as those in FIG. 7. FIG. 8 represents the locus of the optical axis of emitted light 10 of light source 1a of FIG. 7 plus a locus of the optical axis of emitted light 10 of each of light sources 1b and 1c. Where light source 1a is disposed and in which direction mirror 2 rotates are the same as in FIG. 7.

Light sources 1a, 1b, and 1c are disposed as shown in FIG. 4. The angle formed by the zx plane and the optical axis of light 7a from light source 1a is 16.5 [deg]. The angle formed by the zx plane and each of the optical axes of lights 7b and 7c emitted from light sources 1b and 1c is 21.5 [deg]. On the zx plane, light 7a has its optical axis on the z-axis. Angles θyb and θyc formed on the zx plane by the optical axes of lights 7b and 7c and the z-axis are each 45 [deg].

The locus of the optical axis of emitted light 10 of light source 1a is indicated by a solid line, and a discrete locus of the optical axis of emitted light 10 of each of light sources 1b and 1c is indicated by crosses. The discrete locus of the optical axis of emitted light 10 of each of light sources 1b and 1c is obtained by limiting angle of rotation. Thus disposing light sources 1b and 1c at positions higher in level (or in the positive direction along the y-axis) can make continuous the loci of the optical axes of emitted light 10 of light sources 1a, 1b and 1c.

Figure 9:
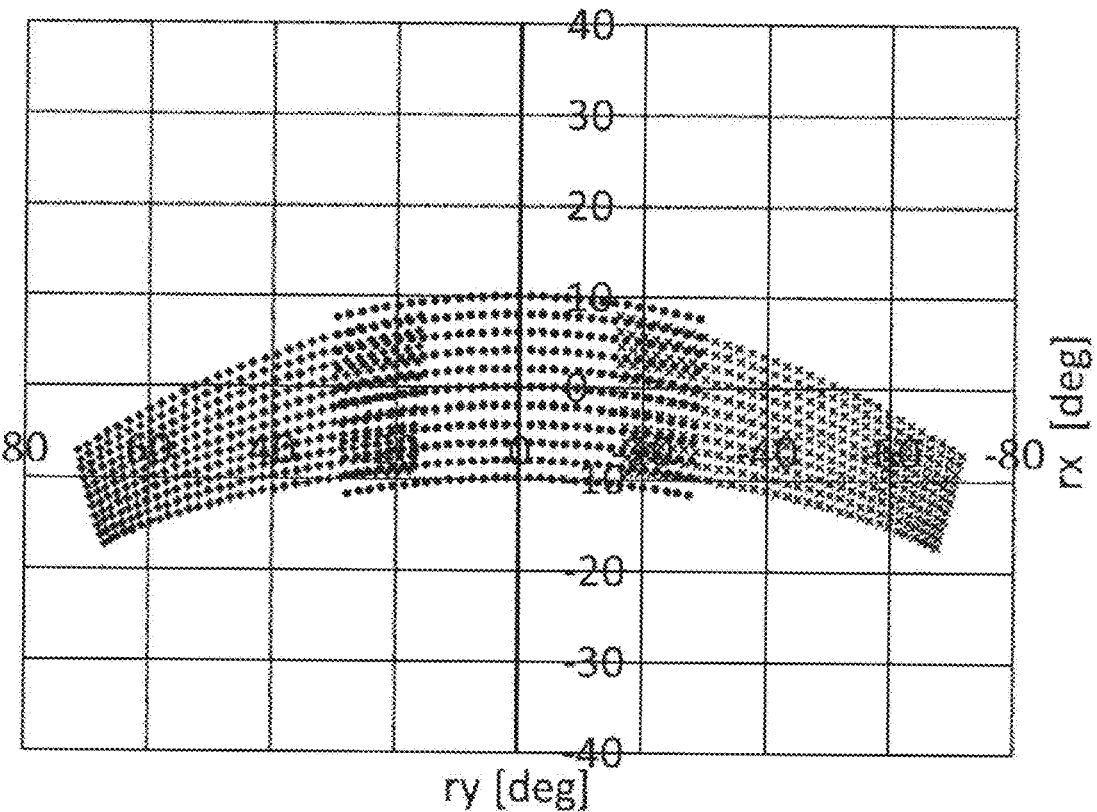
FIG. 9 illustrates another example of the locus of emitted light 10.

FIG. 9 illustrates another example of the locus of the optical axis of emitted light 10. FIG. 9 represents loci of optical axes of emitted light 10 of light sources 1a, 1b, and 1c. FIG. 9 shows an example in which mirror 2 is rotated using the x-axis and the y-axis when light sources 1a, 1b, and 1c are disposed as shown in FIG. 8. It can be seen that scanning ranges 200a, 200b, and 200c of the optical axes of light 10 emitted by light sources 1a, 1b, and 1c have their respective vertical centers (i.e., centers as seen in the direction along the y-axis) continuously.

The angle formed by the zx plane and the optical axis of light 7b is set to 21.5 [deg] for the following ground: 21.5 [deg] is larger by 5 [deg] than an angle of 16.5 [deg] formed by the zx plane and the optical axis of light 7a. As shown in FIG. 7, when the direction of the optical axis of emitted light 10 of light source 1 is rotated by 45 degrees in the ry direction, the direction of the optical axis of emitted light 10 of light source 1 is rotated by 5 degrees in the negative rx direction. The optical axis of emitted light 10 constantly emanates in a direction of 16.5 [deg] downward as seen at mirror 2 (i.e. on the negative side in the direction along the y-axis). However, for a position of 45 [deg] in the positive ry direction, it emanates on a lower side (i.e., on a more negative side in the direction along the y-axis) by 5 [deg] in the rx direction than for a position of 0 [deg] in the rx direction.

Since the optical axis of light $7b$ of light source $1b$ has angle $\theta yb$ of 45 [deg], the optical axis of emitted light $10$ emanates in a direction of 45 [deg] in the positive ry direction when the normal to mirror $2$ is in the direction along the z-axis. Note, however, that the direction of emission of the optical axis of emitted light $10$ at that time serves as the center of scanning range $200b$ provided by light $7b$. Therefore, when scanning range $200b$ by the optical axis of light $7b$ is superimposed on scanning range $200a$ by the optical axis of light $7a$, scanning range $200b$ by the optical axis of light $7b$ is shifted by 45 degrees in the positive ry direction and shifted by 5 degrees in the negative rx direction. The angle formed by the zx plane and the optical axis of light $7b$ is set to 21.5 [deg], which is 5 [deg] larger than 16.5 [deg].

Thus, by referring to the locus of the optical axis of light $10$ emitted by light source $1a$, the other light sources $1b$ and $1c$ can be determined in level (or position in the direction along the y-axis). In the above example, continuity of a portion of scanning range $200$ that is located at a center in the upward/downward direction (or the direction along the y-axis) is considered. However, when continuity of scanning range $200$ on the upper side (or the positive side in the direction along the y-axis) or the lower side (or the negative side in the direction along the y-axis) is considered, it can be achieved by finely adjusting the above-indicated result.

A method of calculating the level of the optical axis of light $7b$ emitted by light source $1b$ when angle $\theta yb$ formed in the zx plane by the optical axis of light $7b$ and the z-axis is 30 [deg], will be described below. Since the optical axis of emitted light $10$ in FIG. $7$ is 2 [deg] lower in the rx direction for 30 [deg] in the ry direction, the angle formed by the zx plane and the optical axis of light $7b$ may be set to an angle larger by 2 [deg] than 16.5 [deg], i.e., 18.5 [deg]. Thus, information of the locus of the optical axis of light $10$ emitted by one light source $1$ can be used to predict the locus of the optical axis of light $10$ emitted by another light source $1$. Then, the level of the other light source $1$ can be determined from the predicted locus.

When angle $\theta y$ on the zx plane between the optical axis of light $7$ and the z-axis is 60 [deg] or less, continuity of a scanning range can be improved by increasing an angle (a pitch angle) between the zx plane and the optical axis of light $7$ from 0 [deg] by about 12 [deg]. Similarly, when angle $\theta y$ on the zx plane between the optical axis of light $7$ and the z-axis is 60 [deg] or less, continuity of a scanning range can be improved by increasing angle $\theta y$ on the yz plane between the optical axis of light $7$ and the z-axis from 0 [deg] by about 12 [deg].

Modified Example 1

Improving continuity of adjacent scanning ranges $200$ can improve continuity of distance images obtained. In improving continuity of adjacent scanning ranges $200$, light source $1$ distant from the z-axis is disposed at a higher level (on a more positive side in the direction along the y-axis). Therefore, scanning range $200$ has a shape having an increased distortion from the rectangle. To address this, a method will be described hereinafter for suppressing distortion in shape of scanning range $200$ with respect to the rectangle.

FIG. $10$ illustrates another example of the relationship between light source $1$ and scanning range $200$. FIG. $10$ shows an example in which light sources $1f$ and $1g$ are disposed at a position lower in level (i.e. on a more negative side in the direction along the y-axis) from the FIG. $5$ arrangement of light sources $1e$, $1f$ and $1g$. FIG. $10$ represents scanning ranges $200e$, $200f$ and $200g$ by light sources $1e$, $1f$, and $1g$.

Lowering light source $1$ in level allows scanning range $200$ to have a shape close to the rectangle. Note, however, that when light source $1$ is lowered in level, scanning range $200$ will be higher in level. Therefore, scanning range $200e$ of light source $1e$ that remains unchanged in level will have a position lower in level than scanning ranges $200f$ and $200g$.

When light source $1$ is fixed in level and moved in the positive direction along the x-axis, scanning range $200$ will be gradually, increasingly distorted in shape. That is, when light source $1$ is fixed in level and has a larger distance to the y-axis, scanning range $200$ will be gradually, increasingly distorted in shape. Therefore, when a plurality of light sources $1$ are disposed at the same level, scanning range $200$ of light source $1$ most distant from the y-axis is most distorted from the rectangle. One method for correcting distortion of a plurality of scanning ranges $200$ applies more correction of distortion to scanning range $200$ more distant from the y-axis. This can level distortion of the plurality of scanning ranges $200$ in magnitude.

As shown in FIG. $2$, when reflected light $30$ is reflected by mirror $2$ and thereafter received by light receiving unit $3$, the smaller the angle formed by light source $1$ and mirror $2$ is, the larger the area of mirror $2$ projected on light receiving unit $3$ is. The larger the effective area of mirror $2$ with respect to light receiving unit $3$ is, the larger the quantity of light incident on light receiving unit $3$ is. Thus, distance measuring apparatus $100$ is enhanced in performance in measuring a distance. Thus, performance in measuring a distance can be improved by disposing the plurality of light sources $1$ as described above.

A condition is indicated by using an incident angle on mirror $2$ of the optical axis of light $7$ emitted from light source $1$. Two adjacent scanning ranges $200a$ and $200b$ have their distortions leveled in magnitude by satisfying the following condition: When angle $\theta yb$ is larger than angle $\theta ya$, angle $\theta xb$ is smaller than angle $\theta xa$. Angle $\theta yb$ is an angle formed on the zx plane by the optical axis of light $7b$ emitted from light source $1b$ and the z-axis. Angle $\theta ya$ is an angle formed by the optical axis of light $7a$ emitted from light source $1a$ and the z-axis. Angle $\theta xb$ is an angle formed on the yz plane by the optical axis of light $7b$ emitted from light source $1b$ and the z-axis. Angle $\theta xa$ is an angle formed by the optical axis of light $7a$ emitted from light source $1a$ and the z-axis. Note, however, that angles $\theta xa$, $\theta xb$, $\theta ya$, and $\theta yb$ each constantly have a positive value (or absolute value) to indicate a magnitude of an angle. Light sources $1a$ and $1b$ are both present on the positive side along the y-axis or present on the negative side along the y-axis.

Similarly, in order to level distortions of three adjacent scanning ranges $200$ in magnitude, light source $1$ that is farther away from the z-axis is disposed at a lower level. The smaller angles $\theta ya$, $\theta yb$, and $\theta yc$ are, the larger angles $\theta xa$, $\theta xb$, and $\theta xc$ are. Angles $\theta ya$, $\theta yb$, and $\theta yc$ are angles formed on the zx plane by the optical axes of lights $7a$, $7b$, and $7c$ emitted from light sources $1a$, $1b$, and $1c$ and the z-axis. Angles $\theta xa$, $\theta xb$, and $\theta xc$ are angles formed on the yz plane by the optical axes of lights $7a$, $7b$, and $7c$ emitted from light sources $1a$, $1b$, and $1c$ and the z-axis.

Further, for example, in order to level distortions of five adjacent scanning ranges $200$ in magnitude, light source $1$ farther away from the z-axis needs to be disposed at a lower level. Note that while light source $1e$ is positioned with angle $\theta xe$ of 0 degree, angle $\theta xe$ may be other than 0 degree.

13

14

Figure 10:
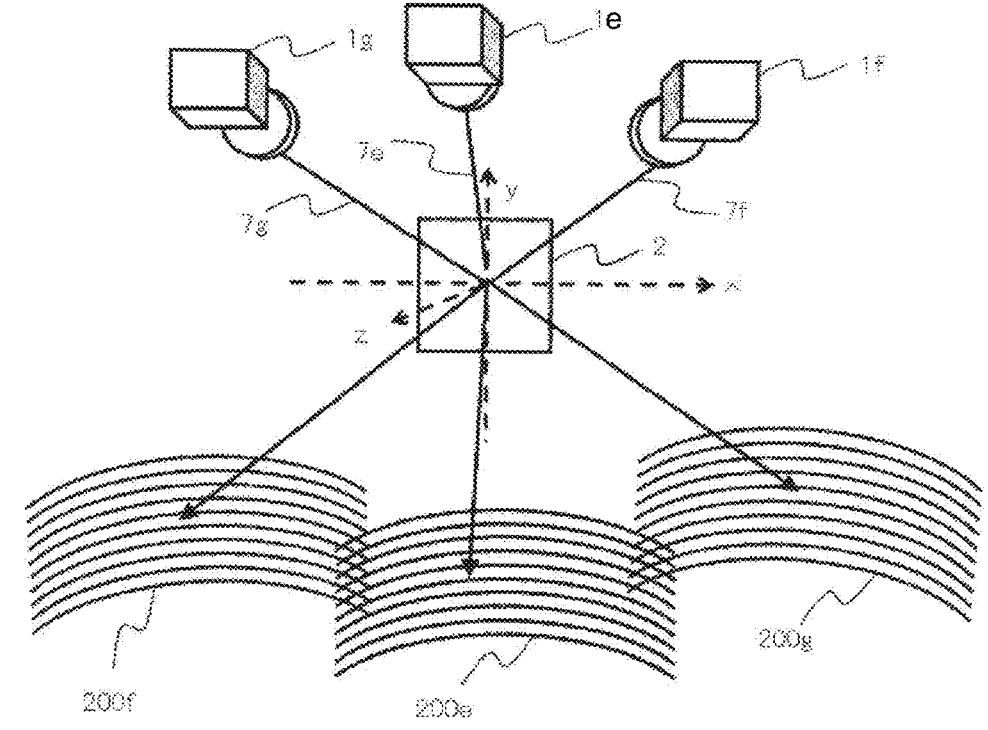
FIG. 10 illustrates another example of the relationship between light source 1 and scanning range 200.

That is, while light source 1e is located above the z-axis in FIG. 10, light source 1e may be located at a position other than a position above the z-axis.

Figure 11:
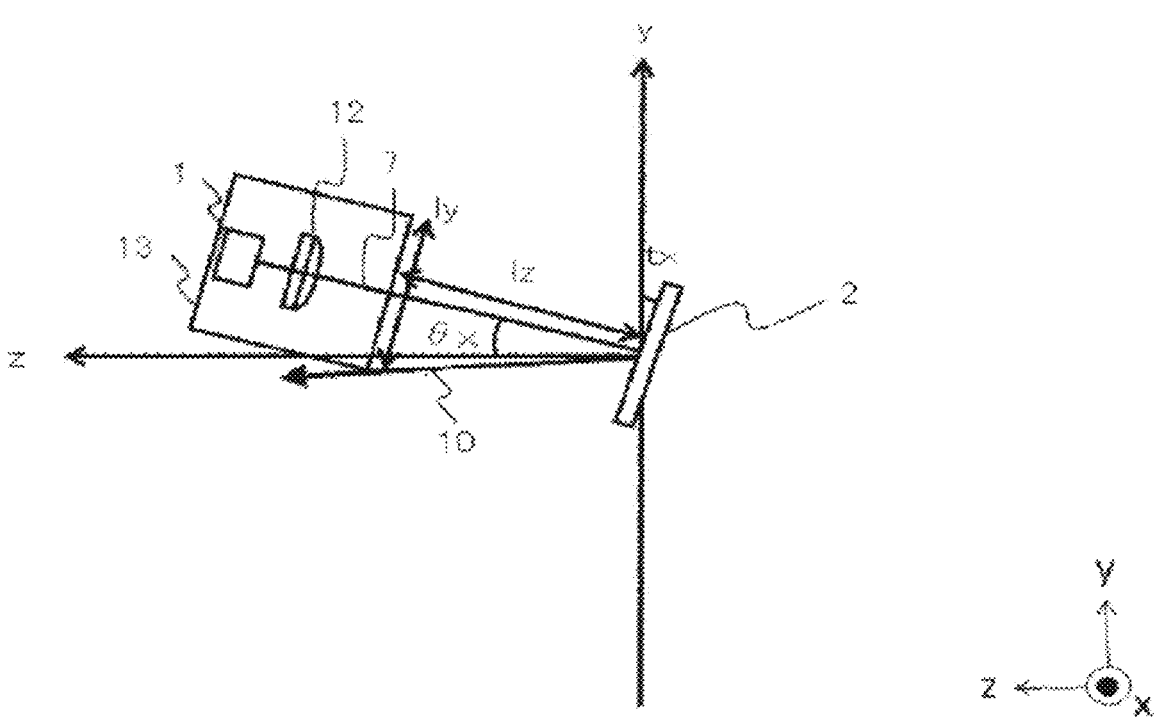
FIG. 11 illustrates a positional relationship between light source 1 and a mirror 2.

If light source 1 is disposed at an excessively low level, light source 1 may block emitted light 10. To address this, a condition applied in disposing light source 1 will be indicated below. FIG. 11 illustrates a positional relationship between light source 1 and mirror 2. A light source box 13 is a box surrounding light source 1. For simplicity, light source box 13 has a height 1y in a direction perpendicular to light 7 emitted by light source 1. There is a distance 1z from light source box 13 to mirror 2. Mirror 2 rotates about the x-axis from an angle+tx to an angle−tx.

An angle at which light source box 13 does not block emitted light 10 when angle θx is changed, is calculated. Angle θx is an angle formed on the yz plane by the optical axis of light 7 emitted from light source 1 and the z-axis. On the yz plane, a minimum angle between the optical axis of light 7 and the optical axis of emitted light 10 is expressed by 2(θx−tx). On the yz plane, an angle formed by a straight line connecting the center of mirror 2 and the lower end of light source box 13 and the optical axis of light 7 is expressed by a tan(ly/2lz). Therefore, angle θx needs to satisfy the following condition:

$$\theta x > (a\ \tan(ly/2lz) + 2tx)/2$$

Modified Example 2

Figure 12:
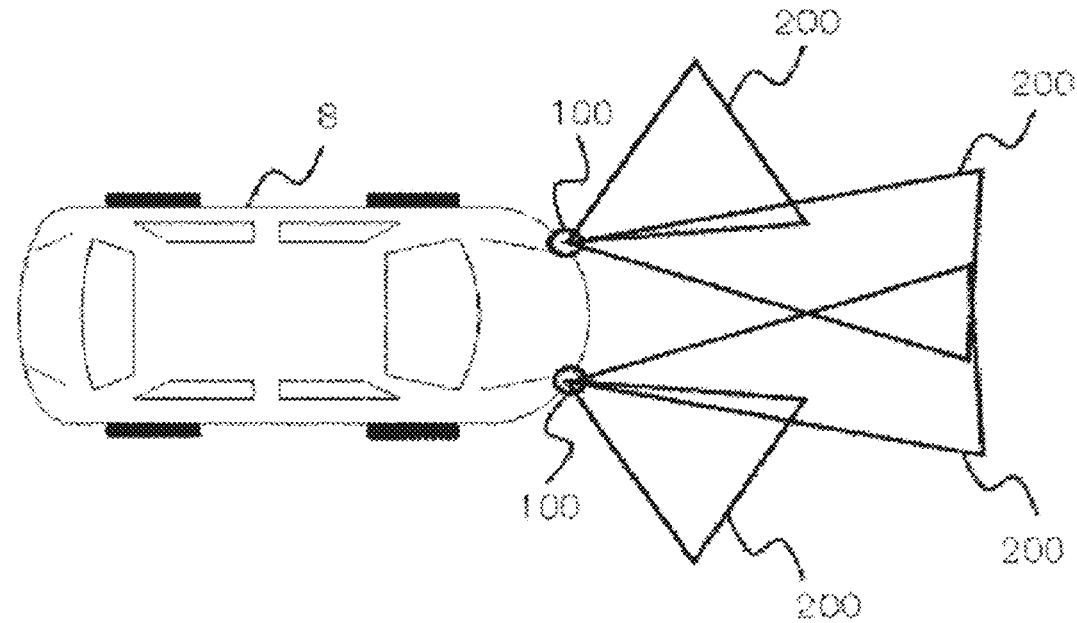
FIG. 12 shows another configuration in which distance measuring apparatus 100 according to the first embodiment is installed in a vehicle.

The plurality of light sources 1 need not be disposed to be symmetrical with respect to mirror 2. FIG. 12 shows a configuration of another example when distance measuring apparatus 100 is provided to vehicle 8. An example in which distance measuring apparatus 100 is disposed on a front side of the vehicle at two locations on the right and left sides, will be described. Distance measuring apparatus 100 includes two light sources 1. Therefore, distance measuring apparatus 100 can obtain two scanning ranges 200. By disposing two light sources 1 asymmetrically with respect to mirror 2, two scanning ranges 200 will also be asymmetrical.

Figure 13:
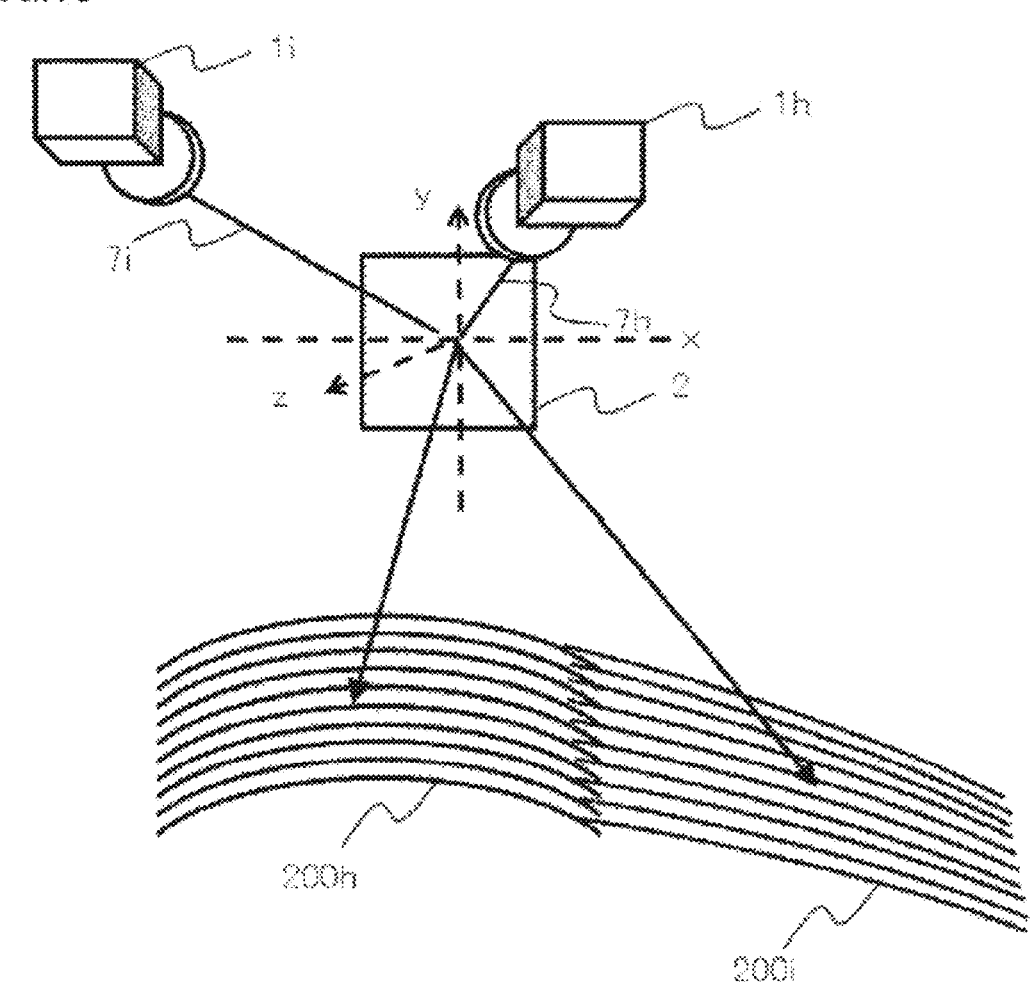
FIG. 13 illustrates another example of the relationship between light source 1 and scanning range 200.

FIG. 13 illustrates an example of a relationship between light source 1 and scanning range 200. FIG. 13 represents scanning ranges 200h and 200i when light sources 1h and 1i are disposed in a direction along the x-axis. Light source 1h is disposed on the positive side along the x-axis, and light source 1i is disposed on the negative side along the x-axis. An angle θyi is larger than an angle θyh. Angle θyi is an angle formed on the zx plane by the optical axis of light 7i emitted from light source 1i and the z-axis. Angle θyh is an angle formed on the zx plane by the optical axis of light 7h emitted from light source 1h and the z-axis. Disposing light source 1i at a higher level (or on a more positive side in the direction along the y-axis) than light source 1h can improve continuity of scanning ranges 200h and 200i.

As shown in FIG. 12, distance measuring apparatus 100 disposed on one side of vehicle 8 obtains a distance image of a range suitable for one side of vehicle 8. For example, scanning range 200 in front of vehicle 8 is set at a high level (or on the positive side in the direction along the y-axis) so as to include a long distance. Scanning range 200 laterally of vehicle 8 is set to a low level so as to include a short distance.

In FIG. 13, scanning range 200h of light source 1h of distance measuring apparatus 100 is set at a high level. Scanning range 200i of light source 1i of distance measuring apparatus 100 is set at a low level. Continuity of scanning ranges 200h and 200i can be improved by adjusting light sources 1h and 1i relatively in level. When this is done, the following condition is established: When angle θyi is larger than angle θyh, angle θxi is larger than angle θxh. Angle θyi is an angle formed on the zx plane by the optical axis of light 7i emitted from light source 1i and the z-axis. Angle θyh is an angle formed by the optical axis of light 7h emitted from light source 1h and the z-axis. Angle θxi is an angle formed on the yz plane by the optical axis of light 7i emitted from light source 1i and the z-axis. Angle θxh is an angle formed by the optical axis of light 7h emitted from light source 1h and the z-axis.

Further, when a distance measuring range is closer to a side surface of an automobile, a range facing downward with respect to the horizontal plane is suitable as the distance measuring range. This is because, for example, when an automobile turns right/left at an intersection or the like, such a range helps to sense a curb stone, a pedestrian and the like easily overlooked on the side of the side surface of the automobile.

In the above-described embodiments, a term indicating a positional relationship between components or a shape of a component, such as "parallel" or "perpendicular," may be used. These terms indicate including a range with manufacturing tolerances, assembling variations, and the like taken into consideration. Therefore, when a positional relationship between components or a shape of a component is specified in the appended claims, it is intended to include a range with manufacturing tolerances, assembling variations, and the like taken into consideration.

While embodiments have been described as above, these embodiments are merely one example.

REFERENCE SIGNS LIST 1, 1a, 1b, 1c, 1e, 1f, 1g, 1h, 1i light source, 2 mirror, 3 light receiving unit, 4 control unit, 5 housing, 6 window, 7, 7a, 7b, 7c, 7e, 7f, 7g, 7h, 7i light, 8 vehicle, 9 object, 10, 10a, 10b, 10c emitted light, 12, 12a, 12b, 12c lens, 13 light source box, 30 reflected light, 31 mirror, 100 distance measuring apparatus, 200, 200a, 200b, 200c, 200e, 200f, 200g, 200h, 200i scanning range.

The invention claimed is:

1. A distance measuring apparatus to measure a distance to an object, comprising:
   a plurality of light sources to emit light;
   a mirror to reflect a plurality of lights emitted from the plurality of light sources; and
   a light receiving unit to receive a plurality of reflected lights that are the plurality of lights reflected by the object,
   the plurality of light sources including a first light source to emit first light and a second light source to emit second light,
   a direction in which a distance measuring area of the distance measuring apparatus is expanded by including the first and second light sources being defined as a first axis,
   an axis that is a normal to the mirror when the mirror is located at a center of a range of rotation and that is orthogonal to the first axis being defined as a second axis,
   an axis perpendicular to the first and second axes and passing through an intersection of the first and second axes being defined as a third axis,
   a plane including the first and second axes being defined as a first plane, a plane including the second and third axes being defined as a second plane, when the mirror rotates about at least the first axis, an angle formed by an optical axis of the second light projected on the first plane and the second axis being larger than an angle formed by an optical axis of the first light projected on the first plane and the second axis, and an angle formed by the optical axis of the second light projected on the second plane and the second axis being larger than an angle formed by the optical axis of the first light projected on the second plane and the second axis.

2. The distance measuring apparatus according to claim 1, wherein the first light and the second light scanned by the mirror form a plurality of scanning ranges disposed along the first axis.

3. The distance measuring apparatus according to claim 1, wherein the plurality of light sources further include a third light source to emit a third light, the distance measuring area is further expanded along the first axis by further including the third light source, and when the optical axis of the first light, the optical axis of the second light, and an optical axis of the third light, as projected on the first plane, each form a larger angle with the second axis, the optical axis of the first light, the optical axis of the second light, and the optical axis of the third light, as projected on the second plane, each form a larger angle with the second axis.

4. The distance measuring apparatus according to claim 3, wherein the first light, the second light, and the third light scanned by the mirror form a plurality of scanning ranges disposed along the first axis.

5. A distance measuring apparatus to measure a distance to an object, comprising:

a plurality of light sources to emit light;

a mirror to reflect a plurality of lights emitted from the plurality of light sources; and a light receiving unit to receive a plurality of reflected lights that are the plurality of lights reflected by the object, the plurality of lights being scanned by the mirror to form a plurality of scanning ranges disposed along a first axis that is one rotation axis of the mirror, the distance measuring apparatus having a distance measuring area expanded along the first axis, an axis that is a normal to the mirror when the mirror is located at a center of a range of rotation and that is orthogonal to the first axis being defined as a second axis, an axis perpendicular to the first and second axes and passing through an intersection of the first and second axes being defined as a third axis, a plane including the first axis and the second axis being defined as a first plane, a plane including the second axis and the third axis being defined as a second plane, when an optical axis of each emitted light of the plurality of light sources, as projected on the first plane, forms a larger angle with the second axis, an optical axis of each emitted light of the plurality of light sources, as projected on the second plane, forming a larger angle with the second axis.

6. The distance measuring apparatus according to claim 5, wherein the angle formed by the optical axis of each emitted light of the plurality of light sources as projected on the first plane and the second axis is different from the angle formed by the optical axis of each emitted light of the plurality of light sources as projected on the second plane and the second axis.

7. The distance measuring apparatus according to claim 5, wherein the angle formed by the optical axis of each emitted light of the plurality of lights as projected on the first plane and the second axis is 60 degrees or less, and the angle formed by the optical axis of each emitted light of the plurality of lights as projected on the second plane and the second axis is 0 degrees or more and 12 degrees or less.

8. The distance measuring apparatus according to claim 2, wherein, of the plurality of scanning ranges, a pair of scanning ranges adjacent to each other overlap each other each at an end thereof adjacent to the other scanning range.

9. The distance measuring apparatus according to claim 2, wherein the plurality of scanning ranges are continuous at their respective centers, upper sides or lower sides as seen in a direction along the third axis.

10. The distance measuring apparatus according to claim 2, wherein the plurality of scanning ranges have their respective centers to be positionally different from each other.

11. The distance measuring apparatus according to claim 1, wherein the plurality of light sources are located on a same side with respect to the first plane.

12. The distance measuring apparatus according to claim 1, wherein the plurality of light sources have one light source and another light source adjacent to each other, disposed such that an angle formed by an optical axis of emitted light of the one light source and an optical axis of emitted light of the other light source, as projected on the second plane, is smaller than an angle formed by the optical axis of the emitted light of the one light source and the optical axis of the emitted light of the other light source, as projected on the first plane.

13. The distance measuring apparatus according to claim 1, wherein the mirror rotates about the first and third axes.

14. The distance measuring apparatus according to claim 5, wherein, of the plurality of scanning ranges, a pair of scanning ranges adjacent to each other overlap each other each at an end thereof adjacent to the other scanning range.

15. The distance measuring apparatus according to claim 5, wherein the plurality of scanning ranges are continuous at their respective centers, upper sides or lower sides as seen in a direction along the third axis.

16. The distance measuring apparatus according to claim 5, wherein the plurality of scanning ranges have their respective centers to be positionally different from each other.

17. The distance measuring apparatus according to claim 5, wherein the plurality of light sources are located on a same side with respect to the first plane.

18. The distance measuring apparatus according to claim 5, wherein the plurality of light sources have one light source and another light source adjacent to each other, disposed such that an angle formed by an optical axis of emitted light of the one light source and an optical axis of emitted light of the other light source, as projected on the second plane, is smaller than an angle formed by the optical axis of the emitted light of the one light source and the optical axis of the emitted light of the other light source, as projected on the first plane.

19. The distance measuring apparatus according to claim 5, wherein the mirror rotates about the first and third axes.

* * * * *